(12) United States Patent
Han et al.

(10) Patent No.: US 7,355,946 B2
(45) Date of Patent: Apr. 8, 2008

(54) METHOD OF RECORDING SIGNALS ONTO A RECORDING MEDIUM

(75) Inventors: Yong Hee Han, Junjoo-si (KR); Sung Woo Park, Daegu-si (KR)

(73) Assignee: LG Electronics Inc., Seoul (KR)

( * ) Notice: Subject to any disclaimer, the term of this patent is extended or adjusted under 35 U.S.C. 154(b) by 661 days.

(21) Appl. No.: 10/253,594

(22) Filed: Sep. 25, 2002

(65) Prior Publication Data

US 2003/0058767 A1 Mar. 27, 2003

(30) Foreign Application Priority Data

Sep. 25, 2001 (KR) ............................ 2001-0059441
Oct. 11, 2001 (KR) ............................ 2001-0062761

(51) Int. Cl.
*G11B 7/00* (2006.01)
(52) U.S. Cl. ................................ 369/53.22; 369/47.54
(58) Field of Classification Search ................ 369/116, 369/47.51, 47.5, 120, 121, 53.22, 44.26, 369/47.54, 47.55, 53.2, 47.52, 275.3, 47.27, 369/47.28, 47.53
See application file for complete search history.

(56) References Cited

U.S. PATENT DOCUMENTS 5,974,011 A * 10/1999 Nakane .................. 369/47.52
6,563,775 B2 * 5/2003 Sato ........................ 369/47.53
6,704,269 B1 * 3/2004 Ogawa ....................... 369/116
6,757,227 B2 * 6/2004 Kumagai et al. ......... 369/44.37
6,891,786 B2 * 5/2005 Sato ........................ 369/47.53
6,894,967 B2 * 5/2005 Tamaru et al. ........... 369/59.25
6,925,042 B2 * 8/2005 Nakajo .................... 369/47.53
7,068,576 B2 * 6/2006 Kobayashi ............... 369/53.22
7,164,633 B2 * 1/2007 Iida et al. ................ 369/47.27

* cited by examiner

*Primary Examiner*—Nabil Hindi
(74) *Attorney, Agent, or Firm*—Birch, Stewart, Kolasch & Birch, LLP

(57) ABSTRACT

A method of recording data onto an optical disk uses a write strategy that corresponds to the recording features of the optical disk. The method detects a track pitch or storage capacity of a recording medium, adjusts a write strategy according to the detected track pitch or storage capacity wherein the write strategy has been chosen to correspond to the manufacturer of the recording medium, and records input data onto the recording medium using the adjusted write strategy. Accordingly, data quality during later reproduction is improved even though it is recorded onto a non-standard disk that is larger in capacity than the standard.

14 Claims, 5 Drawing Sheets

Dotted Line : Write Strategy specified for a disk
Solid Line : Write Strategy adjusted based on track pitch difference

FIG. 5

| Manufacturer | Writing Pulses (Pit Length) | Standard (74 min.) | Extended (80 min.) |
|---|---|---|---|
| Company A | 3T | $T_1$ | $\alpha_1$ |
| | 4T | $T_2$ | $\alpha_2$ |
| | | | |
| | 11T | $T_9$ | $\alpha_9$ |
| ⋮ | ⋮ | ⋮ | ⋮ |

$T_i$ : Pulse Duration
$\alpha_i$ : coefficient (>1)

METHOD OF RECORDING SIGNALS ONTO A RECORDING MEDIUM

BACKGROUND OF THE INVENTION

1. Field of the Invention

The present invention relates to a method of recording data onto an optical disk using a write strategy that corresponds to the recording features of the optical disk.

2. Description of the Related Art

In general, characteristics of writable disks are different, the differences being dependent upon their respective manufacturing companies.

Therefore, a disk device such as a CD writer conducts an optimal power calibration (OPC) using a certain standard writing power for a given disk manufacturer in order to obtain optimal writing power before data is recorded onto a writable disk.

In addition, write strategies for writable disks are also different among disk manufacturing companies. Thus, a microcomputer of a disk device stores information for a particular write strategy of each company for a disk of standard storage capacity, e.g., 74 minutes, and it detects which company is the manufacturer of an inserted disk. Then, it reads the write strategy that is suitable for that company and writes data onto the inserted disk while adjusting pulse level and/or width of writing pulses of an optimal power according to the read/write strategy.

On the other hand, the track pitch of a writable disk may vary according to disk storage capacity. For example, if a disk has standard storage capacity (74 min.) its track pitch is about 1.6 µm, however, if a disk has an 80-minute storage capacity its track pitch is narrower than 1.6 µm.

However, regardless of such a difference, a conventional disk device uses write strategy for standard storage capacity even though an inserted disk has 80-minute capacity or longer. In such a case an optimal writing of data onto an inserted disk cannot be ensured.

In addition, a disk manufacturing process includes material sputtering which makes an outer part of a disk thicker than an inner part. Because of the thickness difference, recording characteristic is deteriorated as the recording point moves toward the outer regions of a disk.

For preventing such deterioration, writing power is increased gradually. However, the more writing power is increased the worse interference between neighboring tracks becomes. Because a disk having storage capacity greater than the standard 74 minutes is narrower in track pitch, interference between tracks becomes more severe than a standard capacity disk when writing power is increased at an outer region.

SUMMARY OF THE INVENTION

It is an object of the present invention to provide a data recording method which determines an optimal writing strategy suitable to a disk condition such as track pitch or storage capacity, and records signals onto a writable disk in accordance with the determined writing strategy.

A method of recording data onto a recording medium in accordance with the present invention is characterized in that it comprises the steps of: detecting a track pitch or storage capacity of a recording medium; adjusting a write strategy according to the detected track pitch or storage capacity wherein the write strategy has been chosen suitably for a manufacturer of the recording medium; and recording input data onto the recording medium using the adjusted write strategy.

Another method of recording data onto a recording medium in accordance with the present invention is characterized in that it comprises the steps of: detecting storage capacity of a recording medium; detecting a current recording position on the recording medium in case that the detected storage capacity is larger than a preset value; and adjusting a write strategy chosen suitably for a manufacturer of the recording medium, if the detected current position is beyond a predetermined location.

BRIEF DESCRIPTION OF THE DRAWINGS

The accompanying drawings, which are included to provide a further understanding of the present invention, illustrate the preferred embodiments of the invention, and together with the description, serve to explain the principles of the present invention, and wherein:

FIG. 5 shows illustrative information on write strategies stored for different storage capacities.

DETAILED DESCRIPTION OF THE PREFERRED EMBODIMENTS

In order that the-invention may be fully understood, preferred embodiments thereof will now be described with reference to the accompanying drawings.

Figure 1:
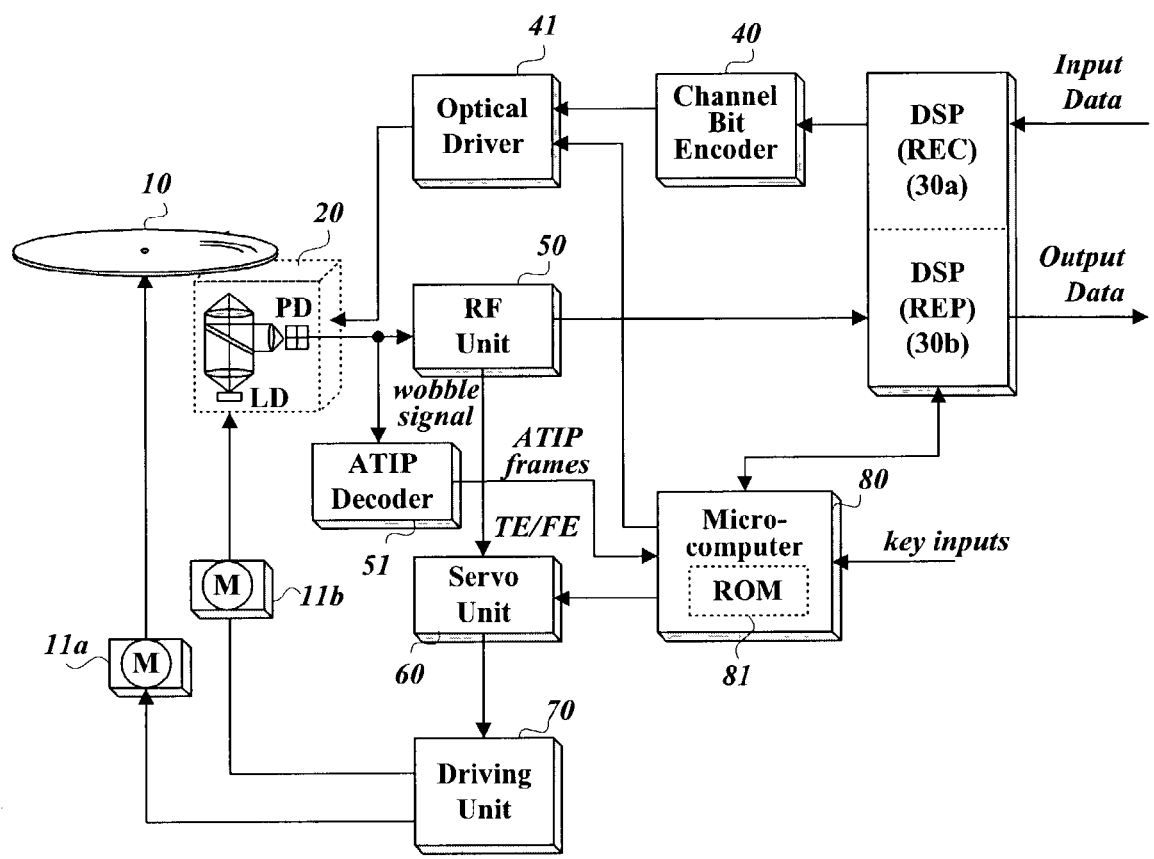
FIG. 1 is a simplified block diagram of a disk drive in which a data recording method of the present invention is embedded.

FIG. 1 is a simplified block diagram of a disk drive in which a data recording method of the present invention is embedded.

The disk drive of FIG. 1 comprises a digital recording signal processing unit 30a for converting input data into record-formatted EFM (Eight to Fifteen Modulation) data while adding additional data such as error correction codes (ECC); a channel bit encoder 40 for converting the record-formatted data into writing signals; an optical driver 41 for generating signals to drive an LD (Laser Diode); an optical pickup 20 for writing signals onto the surface of a writable disk 10 and for reading written signals from the surface of the optical disk 10; an R/F unit 50 for producing binarized signals and TE (Tracking Error) and FE (Focusing Error) signals through filtering and combining the signals detected by the pickup 20; an ATIP decoder 51 for producing ATIP (Absolute Time In Pregroove) frames by decoding a wobble signal detected from the writable disk 10; a driving unit 70 for driving a sled motor 11b to move the optical pickup 20 and a spindle motor 11a to rotate the disk 10; a servo unit 60 for conducting the tracking/focusing operation of an objective lens in the pickup 20 and controlling the driving unit 70 to rotate the disk 10 at a constant speed; a digital reproduced signal processing unit 30b for restoring original data from the binarized signals using a self clock synchronized with the binarized signals in phase; and a microcomputer 80 for controlling an overall recording/reproducing operation, especially, for adjusting writing features of the optical driver 41 with reference to write strategies classified by disk conditions stored in an internal ROM 81.

Figure 2:
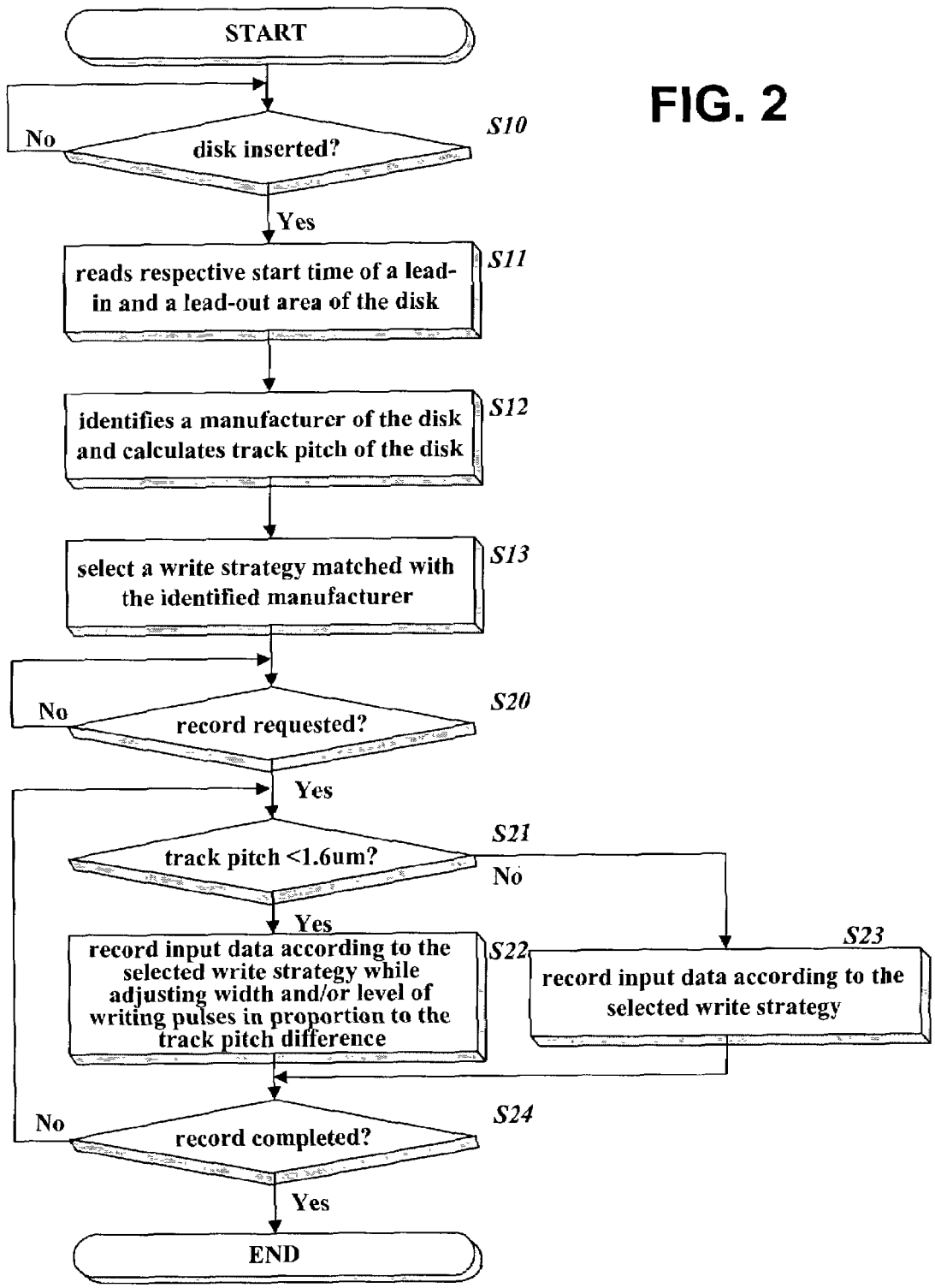
FIG. 2 is a flow chart of the first embodiment of a data recording method in accordance with the present invention.

FIG. 2 is a flow chart of the first embodiment of a data recording method in accordance with the present invention. The flow chart of FIG. 2 conducted by the disk drive structure in FIG. 1 is explained in detail below.

It is supposed in the following explanation that the internal ROM 81 of the microcomputer 80 stores information about write strategies for every disk manufacturing company.

If a write-once disk such as a CD-R is normally placed in the disk drive (S10) it is rotated at a constant speed under control of the microcomputer 80. Afterwards, the microcomputer 80 analyses ATIP frames outputted from the ATIP decoder 51 to search frames decoded from a lead-in area for the 11th (Frame No. N+10) and the 21st (Frame No. N+20) frame, namely, the second and the third special information. Each ATIP frame is composed of three bytes called 'Minutes', 'Seconds' and 'Frames', respectively. Respective MSBs of three bytes of the two frames are '110' and '111', respectively. The 11th frame includes information on the start time of a lead-in area while the 21st frame includes information on the start time of a lead-out area.

If the two frames are found, the microcomputer 80 reads out respective values written therein (S11). At this time, the microcomputer 80 replaces three bits of M1:S1:F1 with '100' for the 11th frame and with '000' for the 21st frame, respectively.

The start time written in the 11th frame has a different value if a manufacturing company is different. Therefore, the microcomputer 80 can identify which company has manufactured the inserted disk 10 based on the read-out start time. From the third special information, the microcomputer 80 knows storage capacity of the disk 10. For example, if three bytes of the third special information is '0111 0000, 0100 0101, 0001 0101', it means that the start time (location) is 70 minutes and 45 seconds and 15 frames because each byte is encoded in BCD (Binary Coded Decimal).

The microcomputer 80 knows the storage capacity from the start time of a lead-out area written in the 21st frame and, then calculates track pitch using a well-known equation and the known storage capacity (S12). If the known storage capacity is 74 minutes the track pitch calculation results in the standard value, namely, about 1.6 µm, however, if it is longer than 74 minutes, the calculation results in a narrower pitch than the standard. The microcomputer 80 selects a write strategy stored in the internal ROM 81 based on the identified company of the disk 10 (S13).

Afterwards, if data recording is requested (S20), the microcomputer 80 checks the calculated track pitch, and, in case that the pitch is standard (about 1.6 µm), it adjusts the level and/or width of writing pulses according to the selected write strategy while recording input data onto the disk 10 (S22). The writing pulses have an optimal writing power determined beforehand through conducting an OPC.

When data is recorded, input data is encoded with parity by the digital recording signal processing unit 30a to form ECC blocks to improve reliability of data recording/reproduction. Each ECC block is outputted in EFM-formatted serial bits from the digital recording signal processing unit 30a to the channel bit encoder 40 that modulates the serial bits into NRZ signals. The optical driver 41 outputs PWM (Pulse-Width Modulated) writing signals according to the modulated NRZ signals while adjusting the level and/or width of the PWM signal in accordance with the selected write strategy. The outputs of the optical driver 41 are converted by the optical pickup 20 to light beams that form respective marks and spaces along a track of the writable disk 10.

However, if the calculated track pitch is narrower than the standard (S21), the microcomputer 80 sets the optical driver 41 to make the width of each writing pulse inversely proportional to the track pitch, while maintaining the level of each pulse as defined in the selected write strategy. The level of each pulse may be lowered based on the difference between the calculated pitch and the standard.

The adjusting rate ($\Delta$) can be given by an equation of $\Delta = k \times 1.6$ um/'the calculated pitch' where k is a proportional constant. Instead of calculating track pitch, the adjusting rate ($\Delta$) can be directly determined by an equation of $\Delta = k' \times$'the detected disk capacity'/74 minutes where k' is a proportional constant, after the storage capacity is known.

Figure 3:
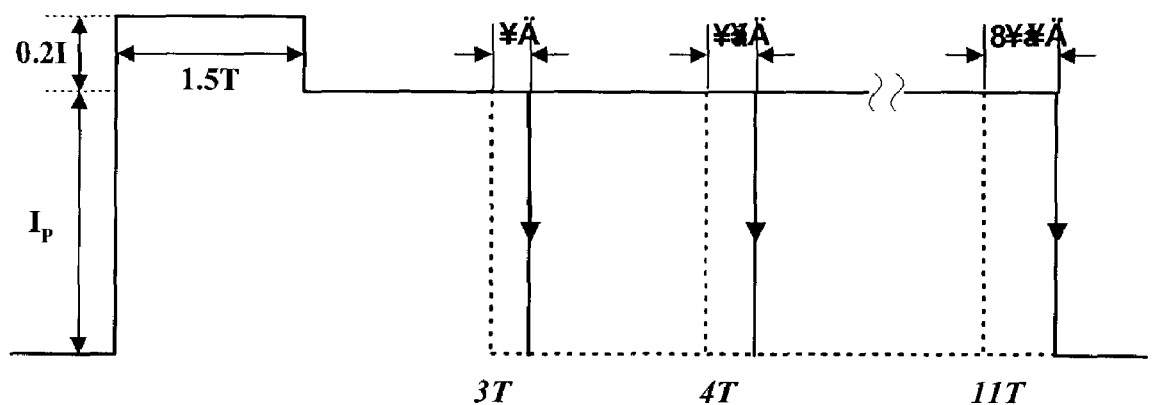
FIG. 3 shows an example in which pulse duration is adjusted to be longer according to the present invention.

FIG. 3 shows an example in which the pulse duration is increased according to the manner explained above. The adjusting rate ($\Delta$) may be applied to all writing pulses nT equally or differently. In case that different adjusting rates are applied, $\Delta$ is applied for 3T, $\alpha\Delta$ for 4T, $2\alpha\Delta$ for 5T, and so on. The constant $\alpha$ is chosen through many experiments.

The optical driver 41 outputs PWM signals made from input data that are adjusted in their duration, for example, as illustrated in FIG. 3. The outputted PWM signals are then written onto the writable disk 10 through the optical pickup 20 (S23).

This writing process continues until the completion of the data record (S24).

Figure 4:
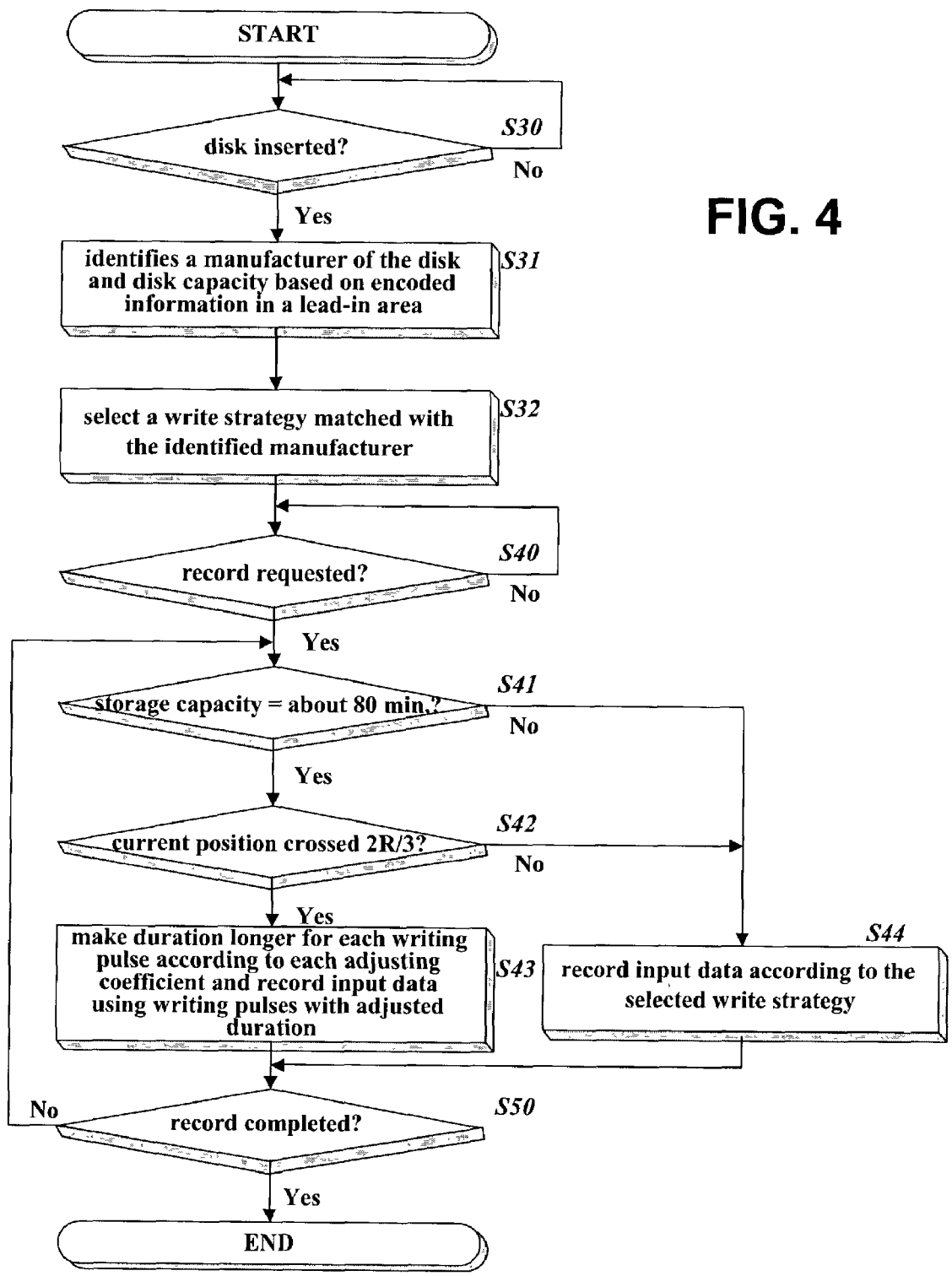
FIG. 4 is a flow chart of the second embodiment of a data recording method in accordance with the present invention.

FIG. 4 is a flow chart of the second embodiment of a data recording method in accordance with the present invention.

For the second embodiment, the internal ROM 81 of the microcomputer 80 stores adjusting coefficients ($\alpha_k$) for a non-standard capacity disk as well as information about width Ti of each pulse kT for a standard capacity disk of every disk manufacturing company. The adjusting coefficients ($\alpha_k$) are also chosen through many experiments. An adjusting coefficient for a long pulse is greater than a coefficient for a short pulse, namely, $\alpha_k < \alpha_{k+1}$. FIG. 5 illustrates information stored in the microcomputer 80.

When the disk 10 is normally placed in the disk drive of FIG. 1 (S30), the microcomputer 80 rotates the disk 10 while analyzing ATIP frames outputted from the ATIP decoder 51. Based on the analyzed ATIP information, the microcomputer 80 identifies the disk manufacturer and the disk capacity as aforementioned in the first embodiment (S31). After the identification, the microcomputer 80 selects a write strategy suitable to the identified manufacturer from the internal ROM 81 (S32).

Afterwards, if data recordation is requested (S40), the microcomputer 80 checks the identified disk capacity, and, in case that the disk capacity is about 80 minutes (S41) longer than the standard, it continues to check whether a current recording position crosses over a certain limit point, e.g., ⅔ of radius of the disk 10. A radial position of the current recording position can be known through inserting an absolute time, written in fields of MIN:SEC:FRAME of each analyzed ATIP frame into a well-known equation.

If the current position has not reached the limit point yet, the microcomputer 80 conducts data recording while adjusting writing pulses having an optimal writing power on a basis of the selected write strategy (S44). If the current position is beyond the limit point, the microcomputer 80 reads each pulse width ($T_k$) and each adjusting coefficient ($\alpha_k$) therefor from the ROM 81, and calculates each pulse duration by multiplying $T_k$ by $\alpha_k$. The calculated duration for each pulse nT is set to the optical driver 41 by the microcomputer 80.

The PWM signals of the optical driver 41 are adjusted in their duration by the setting and are then written onto the writable disk 10 through the optical pickup 20 (S43). This writing process continues until completion of data recording (S50).

If the identified storage capacity is standard, namely, 74 minutes, the microcomputer 80 conducts data record while adjusting writing pulses on a basis of the selected write strategy as mentioned before (S44).

The above-explained data recording method can improve data quality during later reproduction even though it is recorded onto a non-standard disk that is larger in capacity than the standard.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of recording data onto a recording medium, comprising the steps of:
   (a) detecting a track pitch of the recording medium;
   (b) adjusting a write strategy according to the detected track pitch, the write strategy being chosen to correspond to the a manufacturer of the recording medium; and
   (c) recording input data onto the recording medium using the adjusted write strategy,
   wherein, if the detected track pitch is smaller than a preset value, said step (b) increases pulse duration of the chosen write strategy in proportion to the difference between the detected track pitch and the preset value.

2. The method of claim 1, wherein said step (a) detects the track pitch based on the start time of a lead-out area encoded in ATIP information detected from a lead-in area of the recording medium.

3. The method of claim 1, wherein said step (c) records the input data while adjusting an optimal power according to the chosen write strategy, the optimal power being determined through an optimal power calibration.

4. A method of recording data onto a recording medium, comprising the steps of:
   (a) detecting the storage capacity of the recording medium;
   (b) selecting write strategy according to the detected storage capacity, the write strategy chosen to correspond to the manufacturer of the recording medium; and
   (c) recording input data onto the recording medium using the selected write strategy.

5. The method of claim 4, wherein said step (a) detects the storage capacity based on the start time of a lead-out area encoded in ATIP information detected from a lead-in area of the recording medium.

6. The method of claim 4, wherein said step (c) records the input data while adjusting an optimal power according to the chosen write strategy, the optimal power being determined through an optimal power calibration.

7. A method of recording data onto a recording medium, comprising the steps of:
   (a) detecting the storage capacity of the recording medium;
   (b) adjusting a write strategy according to the detected storage capacity, the write strategy being chosen to correspond to the manufacturer of the recording medium; and (c) recording input data onto the recording medium using the adjusted write strategy,
   wherein, if the detected storage capacity is greater than a preset value, said step (b) increases the pulse duration of the chosen write strategy in proportion to the difference between the detected storage capacity and the preset value.

8. A method of recording data onto a recording medium, comprising the steps of:
   (a) detecting the storage capacity of the recording medium;
   (b) detecting a current recording position on the recording medium in case that the detected storage capacity is greater than a preset value; and
   (c) adjusting a write strategy chosen to correspond to the manufacturer of the recording medium, if the detected current position exceeds a predetermined location.

9. The method of claim 8, wherein said step (a) detects the storage capacity based on the start time of a lead-out area encoded in ATIP information detected from a lead-in area of the recording medium.

10. The method of claim 8, wherein the adjustment of the write strategy is to increase the duration of a writing pulse.

11. The method of claim 10, wherein the duration is increased at a different rate for each writing pulse, the writing pulse ranging from 3T to 11T.

12. The method of claim 8, wherein the predetermined location is at about two-thirds point of the radius of the recording medium.

13. A method of recording data onto a recording medium, comprising the steps of:
   (a) detecting a track pitch of the recording medium;
   (b) adjusting a write strategy according to the detected track pitch, the write strategy being chosen to correspond to the a manufacturer of the recording medium; and
   (c) recording input data onto the recording medium using the adjusted write strategy,
   wherein, if the detected track pitch is smaller than a preset value, said step (b) adjusts a level of a writing pulse of the chosen write strategy in proportion to the difference between the detected track pitch and the preset value.

14. A method of recording data onto a recording medium, comprising:
   detecting a storage capacity of the recording medium; and
   recording input data onto the recording medium using a write strategy corresponding to a manufacturer of the recording medium, wherein the write strategy is obtained according to the detected storage capacity of the recording medium.

* * * * *